United States Patent Office 2,824,133
Patented Feb. 18, 1958

2,824,133
MONOHYDRATE OF ALPHA METHOXYISO-BUTYRIC ACID

Elizabeth A. McElhill, Cambridge, Mass., assignor, by mesne assignments, to Escambia Chemical Corporation, Pace, Fla., a corporation of Delaware No Drawing. Application July 29, 1955
Serial No. 525,401

1 Claim. (Cl. 260—535)

This invention relates to the production of chemicals and in particular to the production of a novel hydrate.

A principal object of the present invention is to illustrate the preparation and properties of the hydrate of alpha methoxyisobutyric acid.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a further understanding of the nature and objects of the invention, reference should be had to the following detailed disclosure.

The present invention is directed to a new composition of matter which comprises the hydrate of alpha methoxyisobutyric acid. Alpha methoxyisobutyric acid and its hydrate have considerable utility. For instance, they may, by splitting off methanol, be converted to methacrylic acid. Likewise, they may be first esterified to produce alpha methoxyisobutyric acid esters, which may then be converted into methacrylates. Various methods for achieving the conversion of alpha methoxyisobutyric acid and esters thereof into methacrylic acid and methacrylates, respectively, are illustrated in U. S. Patent 2,525,249.

A specific detailed method of producing the hydrate of alpha methoxyisobutyric acid is set forth in the following example.

Example 1

119 grams of alpha nitratoisobutyric acid was dissolved in about 400 mls. of methanol and neutralized with a methanol solution of potassium hydroxide. The solution was dried over sodium sulphate, filtered, and then refluxed for about five hours. Upon completion of the reaction, the solid potassium nitrate formed was filtered off. The filtrate was acidified with sulphuric acid, diluted with an equal volume of water, and extracted with ether. The ethereal solution was dried over sodium sulphate and then distilled to remove the ether and methanol. Upon completion of the distillation, there was recovered from the distillation flask a white, solid residue. This solid was recrystallized from petroleum ether and identified as the hydrate of alpha methoxyisobutyric acid. This hydrate, with a melting point of -43°–44° C., was found to have an acid equivalent of 136, corresponding to

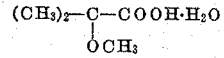

The hydrate, after standing overnight in a vacuum desiccator with phosphorous pentoxide, was converted into a liquid having an acid equivalent of 118, corresponding to alpha methoxyisobutyric acid

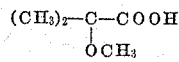

Addition of water to the anhydrous liquid acid caused formation and crystallization of the hydrate. The results of this work indicated that alpha methoxyisobutyric acid forms reversibly a solid hydrate. This hydrate contains but one molecule of water and is soluble only in an excess thereof.

Since certain changes may be made in the above product without departing from the scope of the invention herein involved, it is intended that all material contained in the above description shall be interpreted as illustrative and not in a limiting sense.

What is claimed is:

The chemical compound, the monohydrate of alpha methoxyisobutyric acid, a solid with a melting point on the order of about 43° C.–44° C.

References Cited in the file of this patent
UNITED STATES PATENTS 2,525,249     Weizmann   ------------- Oct. 10, 1950